(12) United States Patent
Matsumoto et al.

(10) Patent No.: US 7,887,348 B2
(45) Date of Patent: Feb. 15, 2011

(54) CARD CONNECTOR

(75) Inventors: Yasuyoshi Matsumoto, Yamato (JP); Mitsuhiro Tomita, Yamato (JP)

(73) Assignee: Molex Incorporated, Lisle, IL (US)

( * ) Notice: Subject to any disclaimer, the term of this patent is extended or adjusted under 35 U.S.C. 154(b) by 8 days.

(21) Appl. No.: 11/920,210

(22) PCT Filed: May 9, 2006

(86) PCT No.: PCT/US2006/017845
§ 371 (c)(1), (2), (4) Date: Jan. 21, 2009

(87) PCT Pub. No.: WO2006/122085
PCT Pub. Date: Nov. 16, 2006

(65) Prior Publication Data
US 2010/0062646 A1 Mar. 11, 2010

(30) Foreign Application Priority Data
May 9, 2005 (JP) .............................. 2005-135825

(51) Int. Cl.
*H01R 29/00* (2006.01)
(52) U.S. Cl. ....................................... 439/188; 439/630
(58) Field of Classification Search ................. 439/188, 439/630
See application file for complete search history.

(56) References Cited

U.S. PATENT DOCUMENTS 6,059,592 A * 5/2000 Inadama ..................... 439/188
6,305,960 B1 10/2001 Fan
6,619,991 B2 * 9/2003 Nishio et al. ................. 439/630
2006/0057892 A1 * 3/2006 Bricaud et al. .............. 439/630

FOREIGN PATENT DOCUMENTS

| EP | 0 908 981 A2 | 4/1999 |
|---|---|---|
| JP | 2002-175735 | 6/2002 |
| JP | 2002-234629 | 8/2002 |
| JP | 2002-252045 | 9/2002 |
| JP | 2002-373740 | 12/2002 |

OTHER PUBLICATIONS

International Search Report and Written Opinion for PCT/US2006/0017845, Oct. 27, 2006.
International Preliminary Report on Patentability for PCT/US2006/0017845, Jun. 18, 2008.
International Search Report for PCT/US2006/017845.

* cited by examiner

Primary Examiner—Gary F. Paumen
(74) Attorney, Agent, or Firm—Timothy M. Morella (57) ABSTRACT

A card connector is configured for receiving a card having contact pads with the card having a thickness and a width perpendicular to the thickness. The card connector includes a housing with a slot for receiving the card and conductive terminals within the housing and which contact the contact pads of the card. A switch includes a first contact member and a second contact member wherein the first contact member is moveable in a direction parallel to the thickness direction of the card upon insertion of the card into the housing such that the first contact member moves relative to the second contact member.

9 Claims, 7 Drawing Sheets

CARD CONNECTOR

FIELD OF THE INVENTION

The present invention relates to a card connector and, more particularly, to a card connector with an improved switch.

BACKGROUND OF THE INVENTION

Conventionally, electronic devices, such as personal computers, mobile telephones, personal digital assistants (PDAs), digital cameras, video cameras, music players, game machines, and vehicle navigation devices, include card connectors so as to use various types of memory cards, such as subscriber identity module (SIM) cards, multi-media cards (MMCs)(R), secure digital(SD) (R) cards, mini SD (R) cards, xD-picture cards (R), memory sticks (R), and smart media (R).

From the standpoint of usability, recent card connectors generally have a push/push structure that allows an operator to push a memory card into the card connector when inserting the memory card or even when removing it. Further, such card connectors are equipped with a detection switch that detects that a memory card has been inserted (see, for example, Japanese Patent Application Laid-Open (kokai) No. 2002-252045). There are generally two types of detection switches, the initial ON-type, where the contact points are in a contact state prior to insertion of the memory card and when the memory card is inserted, the contact points enter a non-contact state; and the initial OFF-type, where the contact points are in a non-contact state prior to insertion of the memory card and when the memory card is inserted, the contact points enter a contact state. Further, these detection switches can be classified into a rearmost-wall-placement-type for placement at the innermost or rearmost wall of the card connector, and a side-wall-placement-type for placement at a side wall of the card connector.

Figure 7:
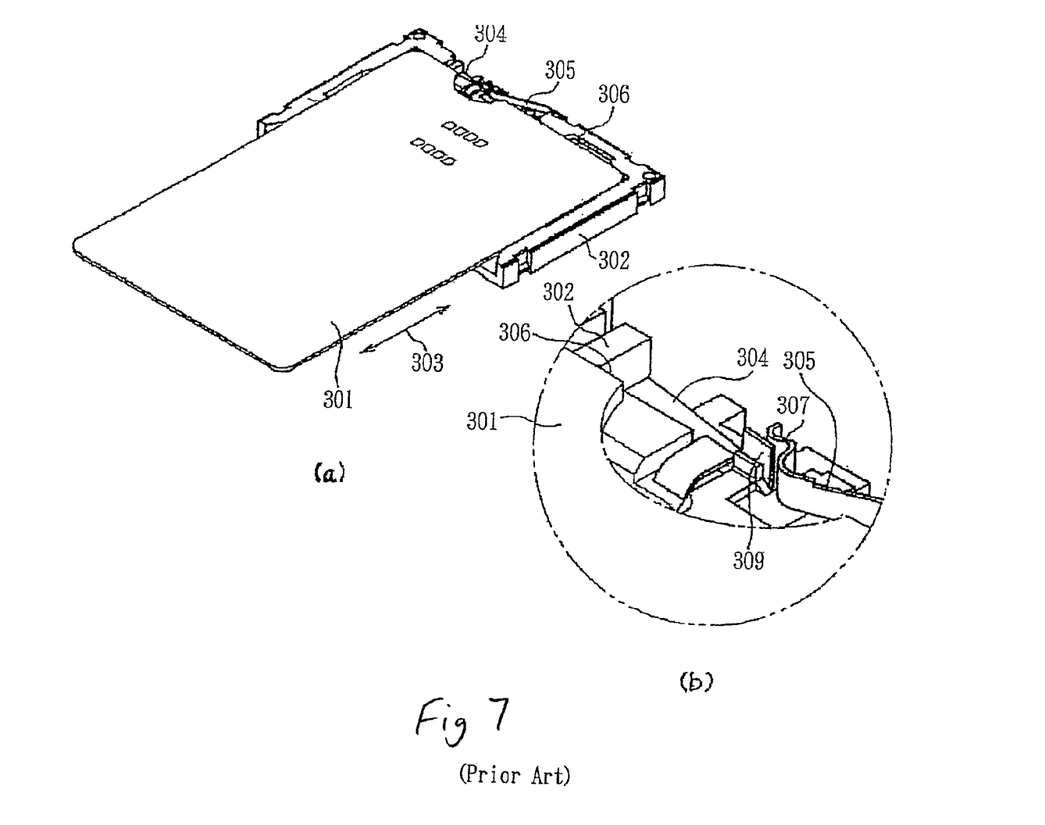
FIG. 7 is a view showing a conventional card connector provided with an initial ON-type detection switch disposed at the rearmost wall.

FIG. 7 is a view showing a conventional card connector provided with an initial ON-type detection switch disposed at the rearmost wall.

In the drawing, reference numeral 301 denotes a memory card that is inserted into the card connector. An arrow denoted by 303 indicates the direction of insertion and removal of the memory card 301. Further, reference numeral 304 denotes a first contact member of the detection switch and is fixed to an insulating housing 302 of the card connector. In the state shown in the drawing, an insertion end 306 of the memory card 301 presses and moves an engagement portion of the second contact member 305 of the detection switch toward the rear, so that the contact point 307 of the second contact member 305 separates from the contact point 309 of the first contact member 304. For this reason, the contact points of the detection switch are in a non-contact state. Due to this, the fact that the memory card 301 has been inserted is detected.

Nonetheless, with the above-described conventional card connector, the non-contact state of the contact points of the detection switch is maintained during insertion of the memory card 301. Accordingly, it is easier for dust to adhere to the contact points, thus increasing the chances of contact failure occurring when the memory card 301 is removed. Further, the amount of displacement of the second contact member 305 when the memory card 301 is removed is small, and further, the contact pressure applied to the contact point 309 of the first contact member 304 by the engagement portion of the second contact member 305 cannot be increased. Accordingly, the amount of wiping performed between the engagement portion of the second contact member 305 and the contact point 309 of the first contact member 304 becomes extremely small, whereby a cleaning effect for the contact points by means of wiping cannot be expected. Furthermore, when the memory card 301 is inserted, the insertion end 306 pushes and moves the second contact member 305 toward the rear, so the reactive force of a spring which supports the second contact member 305 is applied in a direction to push and return the memory card 301. Therefore, in a state where the memory card 310 is loaded in the card connector, the points of contact between the terminals of the memory card 301 and the terminals of the card connector may shift. Another problem exists in that since the size of the card connector in the thickness direction is limited, it is necessary to dispose mounting leads at the rear of the card connector. For this reason, the fixing portions of the mounting leads are disposed at the rearmost wall, thus making the structure of this wall complicated.

Further, in the case of a card connector provided with an initial OFF-type detection switch disposed at the rearmost wall, the amount of wiping can be increased by lengthening the spring that supports the contact member of the detection switch, and a cleaning effect for the connection points of the detection switch by means of wiping can be expected. Nonetheless, since a certain degree of space becomes necessary at the rear of the card connector, the card connector cannot be made compact. Furthermore, since the spring is long, the over-stroke in the push/push structure cannot be shortened. Also, if attempts are made to make the card connector more compact, it is necessary to decrease the distance between the contact points (i.e., the contact gap) of the detection switch, thus making assembly of the card connector difficult. Further, as in the case of a card connector provided with an initial ON-type detection switch disposed at the rearmost wall, when the memory card is inserted, the insertion end pushes and moves the contact member of the detection switch toward the rear. Accordingly, the reactive force of the spring supporting the contact member is applied in a direction to push and return the memory card. For this reason, in a state where the memory card is loaded in the card connector, the points of contact between the terminals of the memory card and the terminals of the card connector may shift. Another problem exists in that since the size of the card connector in the thickness direction is limited, it is necessary to dispose mounting leads at the rear of the card connector. For this reason, the fixing portions of the mounting leads are also disposed at the rearmost wall, so the structure of this wall becomes complicated.

Further, in the case of a card connector provided with an initial ON-type detection switch disposed at the side wall, since it is an initial ON-type switch, it is necessary to increase the contact pressure at the initial state in order to improve the contact reliability of the contact points of the detection switch. However, when each of the members is formed to be thin in order to make the card connector more compact, at the time of solder re-flow, the entire card connector may deform because of residual stress stemming from the contact pressure at the initial state. Furthermore, since the contact points of the detection switch are maintained in a non-contact state during insertion of the memory card, it becomes easier for dust to adhere to the contact points, thus increasing the chances of contact failure occurring when the memory card is removed. Further, the amount of displacement of the contact member of the detection switch when the memory card is removed is small, and the contact pressure cannot be increased. Accordingly, the amount of wiping performed becomes extremely small, whereby a cleaning effect for the contact points of the detection switch by means of wiping cannot be expected.

Further, in the case of a card connector provided with an initial OFF-type detection switch disposed at the side wall, the amount of wiping can be increased by lengthening the spring that supports the contact member of the detection switch, and a cleaning effect for the connection points of the detection switch by means of wiping can be expected. Nonetheless, since a certain degree of space is needed from the side to the rear of the card connector, it becomes impossible to make the card connector more compact. Also, the form of the spring becomes complicated. Furthermore, when the position of the side surface of the memory card displaces from the designed position inside the card connector, the contact pressure of the contact points of the detection switch and the amount of wiping change, so the reliability of the detection switch deteriorates. That is, since the width of the card slot of the card connector is set to be larger than the width of the memory card, a gap exists in the widthwise direction between the wall surface of the card slot and the memory card. Therefore, in a state where the memory card is loaded in the card connector, the memory card may tilt. Should this occur, the side surface of the memory card displaces from its intended or designed position. Further, the same is true when variations occur in the width of the memory card during manufacture, so similarly, the side surface of the memory card displaces from its designed position. Due to this, the contact pressure of the contact points of the detection switch and the amount of wiping change greatly, whereby the reliability of the detection switch deteriorates. It is also necessary to lengthen the spring that supports the contact member of the detection switch so as to cope with the position displacement of the side surface of the memory card. In this case, since a certain amount of space from the side to the rear of the card connector becomes necessary, the card connector cannot be made to be more compact. Also, when the spring is strengthened in order to increase the contact pressure of the contact points, friction with the side surface of the memory card increases, whereby ejection of the memory card with a push/push structure becomes difficult.

SUMMARY OF THE INVENTION

An object of the present invention is to solve the above-mentioned problems of conventional card connecters and to provide a card connector which includes a switch composed of a first contact member that displaces in the thickness direction of a card upon coming into contact with the upper or bottom surface of the card, and a second contact member that comes into contact with and separates from the first contact member, to thereby simplify the structure, reduce cost and size, and realize reliable electrical contact at the contact points of the switch to thereby improve reliability.

In order to achieve the above object, the present invention provides a card connector comprising a housing for accommodating a card having terminal members; connection terminals that are attached to a rear wall of the housing and which contact the terminal members of the card; and a switch including a first contact member and a second contact member attached to a side wall of the housing, wherein the first contact member displaces in the thickness direction of the card due to coming into contact with the upper surface or bottom surface of the card so that the first contact member comes into contact with or separates from the second contact member.

Preferably, the second contact member displaces in the widthwise direction of the card when the second contact member comes into contact with or separates from the first contact member.

Preferably, the first contact member includes a first engagement surface inclined relative to the thickness direction of the card; and the second contact member includes a second engagement surface inclined relative to the thickness direction of the card and coming into contact with the first engagement surface.

Preferably, the second engagement surface is a cut surface of a plate material, and slides on the first engagement surface.

Preferably, the first contact member is formed from a plate of a resilient, electrically conductive material, and includes a root portion attached to the side wall of the housing, a body portion extending from the root portion toward the rear wall of the housing, a first engagement portion connected to the distal end of the body portion and having the first engagement surface, and a projecting portion that projects toward the card side at a location offset from the first engagement portion toward the root portion, the projecting portion coming into contact with the upper surface or bottom surface of the card.

Preferably, the second contact member is formed from a plate of a resilient, electrically conductive material, and includes a root portion attached to the side wall of the housing, a body portion extending from the root portion toward the rear wall of the housing, and a second engagement portion connected to the distal end of the body portion, extending in the widthwise direction of the card, and including the second engagement surface at the distal end thereof.

The card connector according to the present invention includes a switch composed of a first contact member that displaces in the thickness direction of a card upon coming into contact with the upper or bottom surface of the card, and a second contact member that comes into contact with and separates from the first contact member. Therefore, it becomes possible to simplify the structure, reduce cost and size, and realize reliable electrical contact at the contact points of the switch to thereby improve reliability.

BRIEF DESCRIPTION OF THE DRAWINGS

The features of the present invention are set forth with particularity in the appended claims. The organization and manner of the structure and operation of the invention, together with further objects and advantages thereof, may best be understood by reference to the following description taken in connection with the accompanying drawings wherein like reference numerals identify like elements in which:

DETAILED DESCRIPTION OF THE PREFERRED EMBODIMENT

An embodiment of the present invention will next be described in detail with reference to the drawings.

Figure 1:
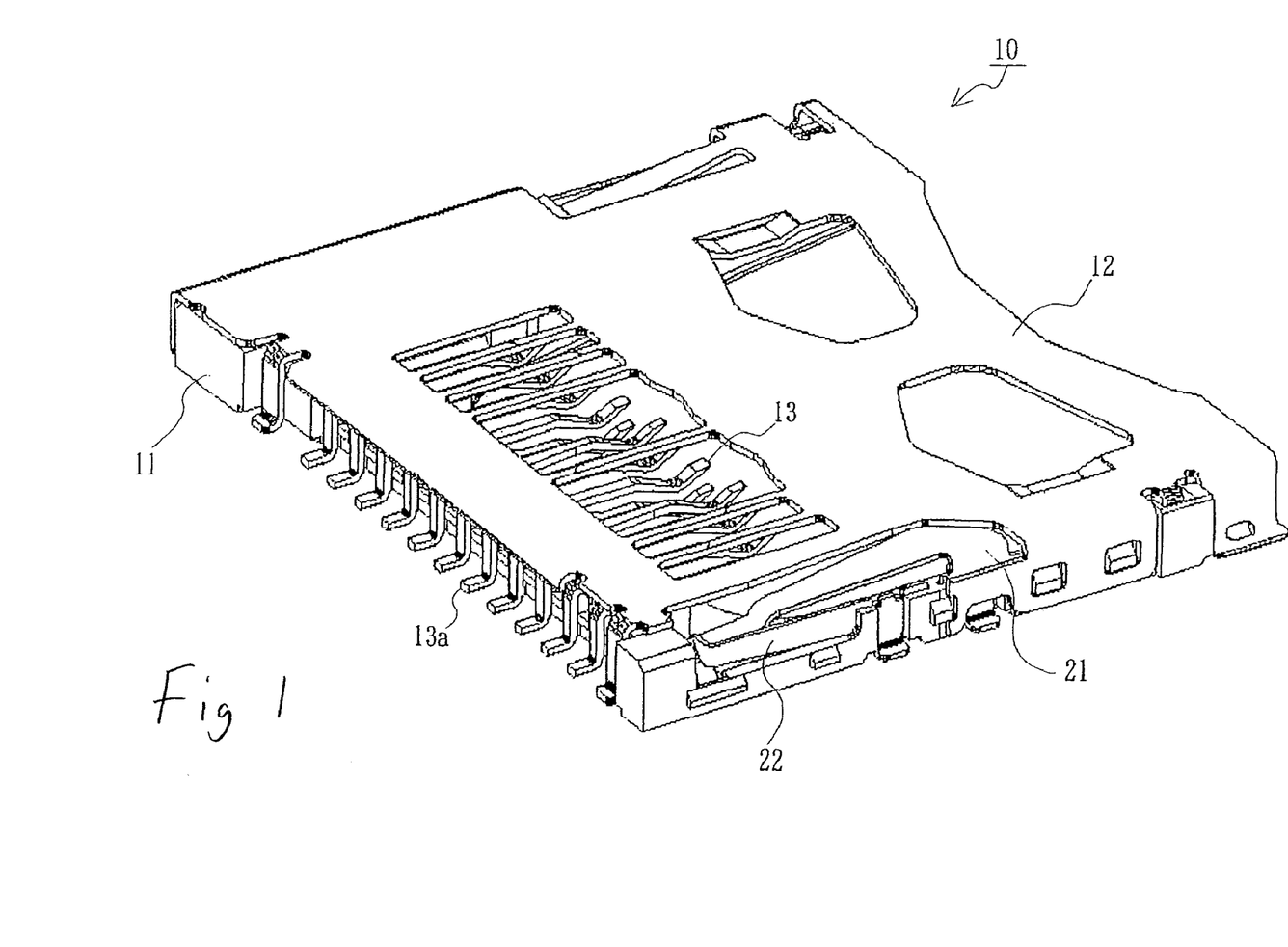
FIG. 1 is a perspective view of a card connector according to an embodiment of the present invention.

In FIG. 1, reference 10 denotes a card connector according to the present embodiment, which is attached to an electronic device, which is not shown. A card 31, which will be described later, is inserted into the interior of the card connector 10. The card 31 is attached to the electronic device via the card connector 10. It should be noted that the electronic device can be any type of device such as, for example, a personal computer, a mobile telephone, a PDA, a digital camera, a video camera, a music player, a game machine, or a vehicle navigation device.

Further, the card 31 can be any type of IC card, for example a SIM card, MMC, SD card, mini SD card, xD-picture card, memory stick, or smart media; however, in the present embodiment, descriptions will be given in the case of a mini SD card. In the description of the present embodiment, terms for expressing direction, such as up, down, left, right, front, and rear, are for explaining the structure and action of portions of the card connector 10. However, these terms represent respective directions for the case where the card connector 10 is used in an orientation shown in the drawings, and must be construed to represent corresponding different directions when the orientation of the card connector 10 is changed.

As shown in FIG. 1, the card connector 10 has a housing 11 integrally formed from an insulating material such as synthetic resin or plastic, and a shell 12 formed from a plate of an electrically conductive material such as metal and through various machining processes such as such as punching or bending. The shell 12 is attached to the upper side of the housing 11. The card connector 10 has a generally flat, parallelepiped shape, and is attached to the electronic device. The card 31 is inserted from the front of the connector (the upper right in FIG. 1).

Figure 2:
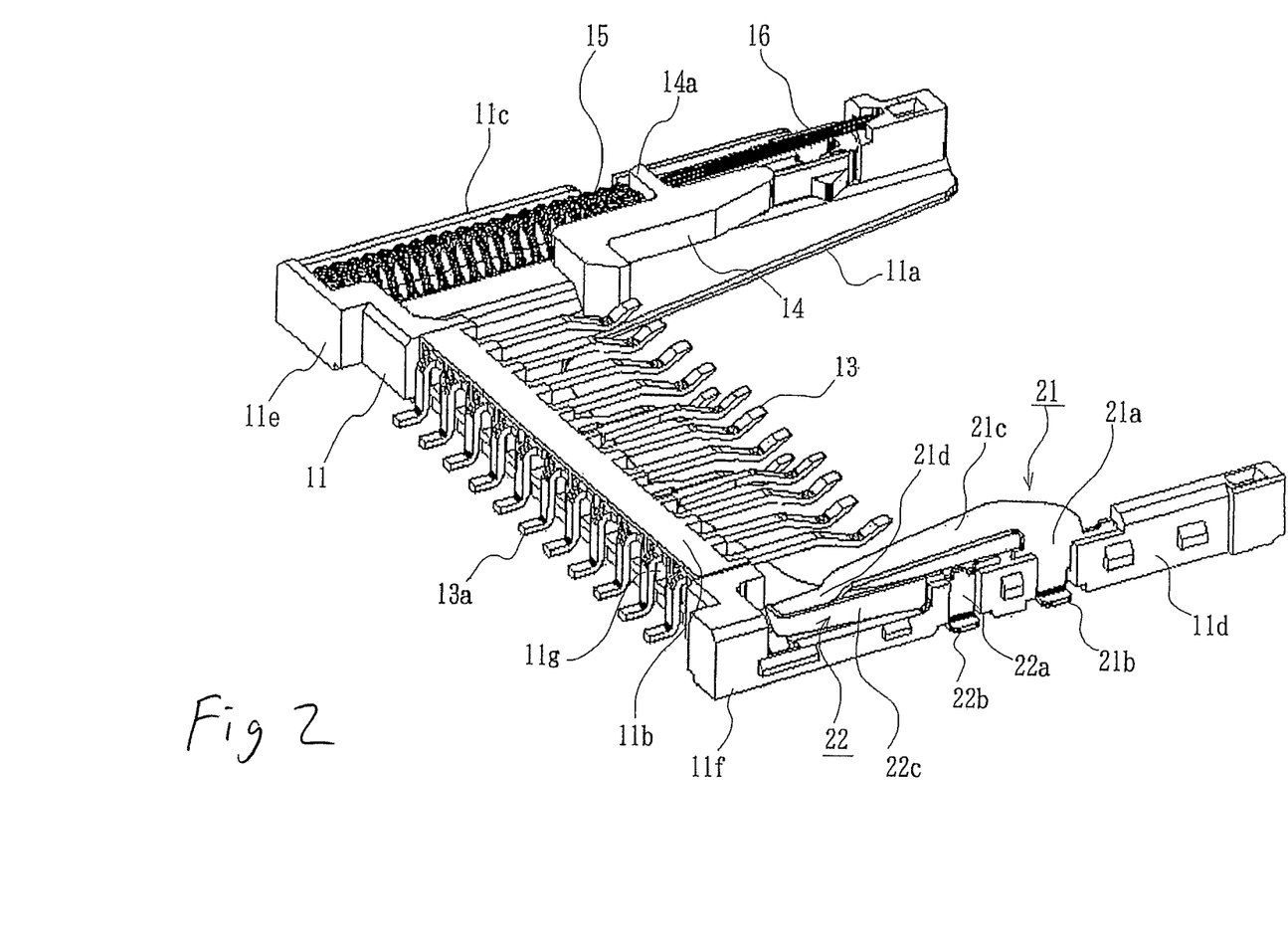
FIG. 2 is a perspective view of the card connector with the shell removed.

Further, FIG. 2 is a diagram showing the card connector 10 with the shell 12 removed for clarity. As shown in FIG. 2, the housing 11 has a bottom wall 11a with a generally U-shaped cutaway extending from the front edge (the upper right side in FIG. 1) thereof. The housing 11 also has a rear wall 11b that extends along the rear edge of the bottom wall 11a and extends upright from the bottom wall 11a. A plurality of terminal loading holes 11g are formed in the rear wall 11b such that the holes penetrate the rear wall 11b in the front and rear directions. Root portions of terminals 13, which serve as connection terminals, are inserted into and attached to the terminal loading holes 11g. The terminals 13 extend toward the front from the rear wall 11b, and have contact portions that project downward at the vicinity of the distal ends thereof. The contact portions come into contact with and are electrically connected with contact pads 32, which serve as terminal members to be described later and which are provided on the upper surface of the card 31. Further, solder tail portions 13a of the terminals 13 having a generally L-shaped form protrude rearward from the rear wall 11b. The solder tail portions 13a are soldered and electrically connected to counterpart terminal members of the electronic device, such as signal traces, contact pads, or terminals formed on a wiring board of the device.

The housing 11 includes a first side wall 11c that extends along one side edge of the bottom wall 11a in the front and rear directions, and has an L-shaped cross section. A slide member 14 of a card-eject mechanism for pushing out the card 31 inserted into the card connector 10 is attached to the first side wall 11c such that it can slide in the front and rear directions. Here, the card connector 10 is assumed to have a push/push structure. Furthermore, the first side wall 11c has a biasing member 15 that is a member for biasing the slide member 14 toward the front. The biasing member 15 is made from a coil spring. The first side wall 11c also has a pin member 16 attached thereto, the pin member 16 engaging with the slide member 14 and stopping the forward movement of the slide member 14. It should be noted that one end of the biasing member 15 is in contact with an engagement portion 11e of the rear wall 11b and the other end thereof is in contact with an engagement portion 14a of the slide member 14.

Further, the housing 11 has a second side wall 11d that extends along the opposite side edge of the bottom wall 11a in the front and rear directions. A first contact member 21 and a second contact member 22, which constitute a switch, are attached to the second side wall 11d. The first contact member 21 and the second contact member 22 come into contact with and separate from each other to thereby enter a conduction state or non-conduction state, to thereby function as a switch. Here, this switch can be used as any type of switch, such as a detection switch that detects whether the card 31 has been properly inserted into the card connector 10 or a write-protect switch that prohibits the writing of new data on the card 31. In the present embodiment, the switch is assumed to be used as a detection switch. More specifically, the card connector will be described under the assumption that the switch is a sidewall-placement-type detection switch that is initially in the OFF position.

The first contact member 21 includes a root portion 21a attached to the second side wall 11d, and a cantilevered body portion 21c, which extends from the root portion 21a toward the rear (the lower left in FIG. 1) and which assumes the form of an elongated plate. It should be noted that the first contact member 21 is a member formed from a plate of a resilient, electrically conductive material, such as metal, and through various machining processes such as punching and bending. The root portion 21a is bent so as to be generally perpendicular to the body portion 21c. The body portion 21c of the first contact member 21 is disposed such that it becomes generally parallel to the bottom wall 11a of the housing 11, and the root portion 21a is disposed such that it becomes generally parallel to the side surface of the second side wall 11d.

Furthermore, the root portion 21a includes a solder tail portion 21b formed at its lower end. The solder tail portion 21b is soldered to and electrically connected to the corresponding counterpart terminal member of the electronic device (that is, a signal trace, a contact pad, a terminal, or the like, formed on the wiring board). Meanwhile, a first engagement portion 21e, which will be described later, is connected at the distal end of the body portion 21c. The first engagement portion 21e is provided with a first engagement surface 21f, which will also be described later, at its distal end. It should be noted that a downward projecting portion 21d is provided on the body portion 21c at a location offset from the first engagement portion 21e toward the root portion 21a. The downward projecting portion 21d projects downward, that is, toward the card 31 side, and comes in contact with the upper surface of the card 31. The downward projecting portion 21d is a portion formed by bending the plate, which forms the body portion 21c, downward in such a manner that the plate assumes a crank shape when viewed from the side thereof. Further, a protection portion 11f of the rear wall 11b is located on the rear side of the first engagement portion 21e so as to protect the engagement portions that serve as the contact points of the switch.

Moreover, the second contact member 22 includes a root portion 22a attached to the second side wall 11d, and a cantilevered body portion 22c, which extends from the root portion 22a toward the rear (the lower left in FIG. 1) and which assumes the form of an elongated plate. It should be noted that the second contact member 22 is a member foamed from a plate of a resilient, electrically conductive material, such as metal, and through various machining processes such as punching and bending. The body portion 22c and the root portion 22a of the second contact member 22 are disposed so as to be generally parallel to the side surface of the second side wall 11d.

Furthermore, the root portion 22a includes a solder tail portion 22b provided at its lower end. The solder tail portion 22b is soldered to and electrically connected to the corresponding counterpart terminal member of the electronic device. Meanwhile, a second engagement portion 22d, which will be described later, is connected to the distal end of the body portion 22c so as to extend in the widthwise direction of the card 31, that is, in the wall surface direction of the rear wall 11b. A second engagement surface 22e, which will be described later, is provided at the distal end of the second engagement portion 22d.

Next, the operation of the switch in the card connector 10 having the above-described structure will be described. Notably, the operation of the slide member 14 is omitted as such operation is well known in the art.

Figure 3:
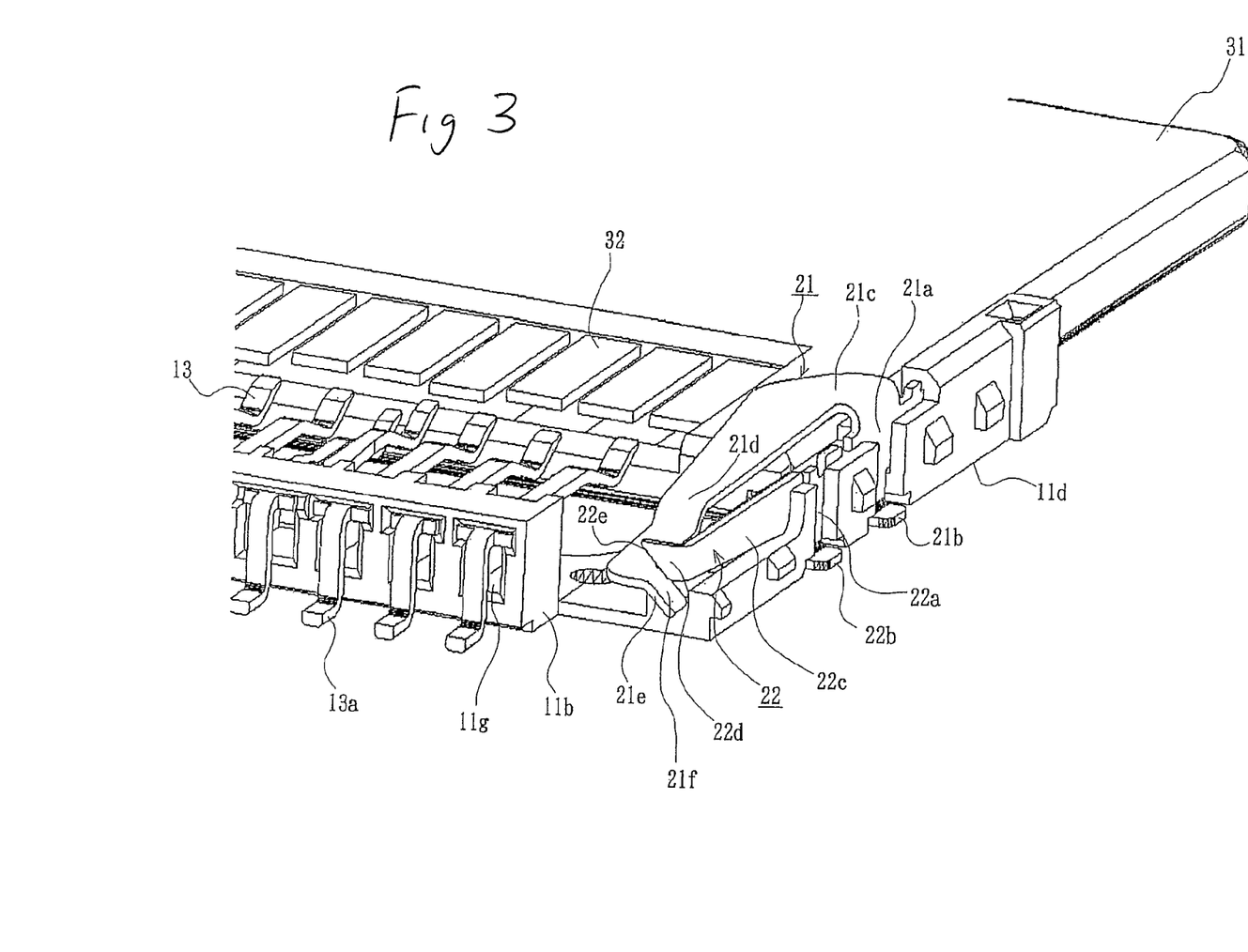
FIG. 3 is an enlarged perspective view of a main portion of the card connector in a state where a card is in the process of being inserted.
Figure 4:
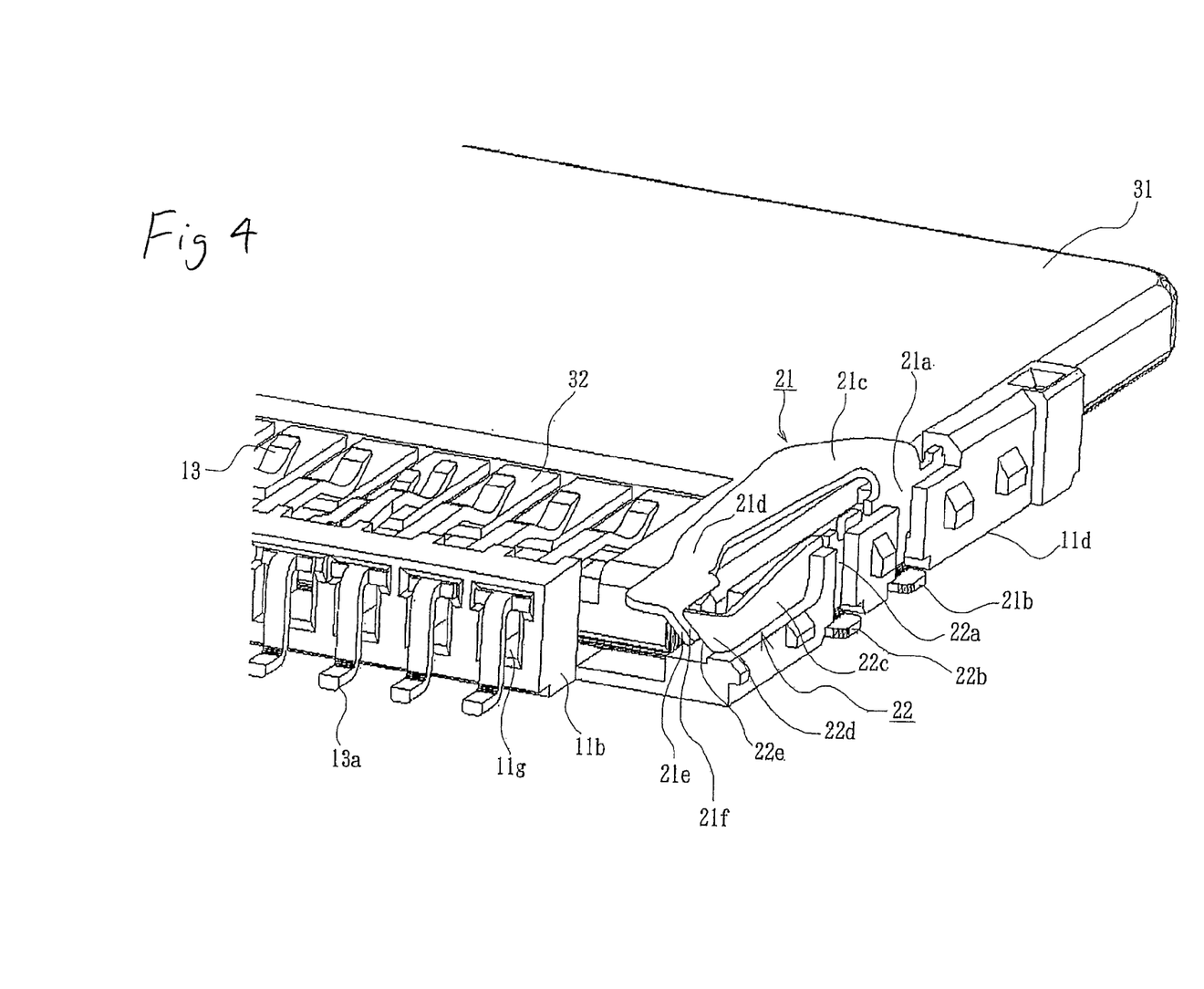
FIG. 4 is an enlarged perspective view of the main portion of the card connector in a state where insertion of a card has been completed.

FIG. 3 is an enlarged perspective view of a main portion of the card connector in a state where a card is in the process of being inserted; and FIG. 4 is an enlarged perspective view of the main portion of the card connector in a state where insertion of a card has been completed.

FIGS. 3 and 4, like FIG. 2, show a state where the shell 12 and the protection portion 11f of the rear wall 11b are removed in order to facilitate description. When the card 31 is inserted midway from the front of the card connector 10, a state as shown in FIG. 3 is created. In this state, the contact pads 32 arranged on the upper surface of the insertion end of the card 31 do not reach the positions of the terminals 13. Further, at the side edge of the card 31, the upper edge of the insertion end of the card 31 reaches the lower side of the body portion 21c of the first contact member 21, however, it does not reach the downward projecting portion 21d.

The first contact member 21 is disposed such that in the initial condition, a portion of the body portion 21c between the root portion 21a and the downward projecting portion 21d is positioned higher that the inserted card 31. It should be noted that the initial condition is a state where the card 31 has not been inserted into the card connector 10, however, here, as shown in FIG. 3, the condition includes a state where the card 31 is inserted midway into the card connector 10. That is, the lower surface of the body portion 21c at the portion between the root portion 21a and the downward projecting portion 21d is prevented from engaging the upper surface of the inserted card 31. Meanwhile, in the initial condition, the downward projecting portion 21d is positioned lower than the inserted card 31, i.e., the lower surface of the downward projecting portion 21d contacts the upper surface of the inserted card 31 such that the downward projecting portion 21d is pressed upward.

The second contact member 22 is disposed such that a portion of the body portion 22c between the root portion 22a and the second engagement portion 22d is positioned on the outside of the inserted card 31. In other words, the inner side surface (the right-side surface in FIG. 3) of the body portion 22c at a portion between the root portion 22a and the second engagement portion 22d is prevented from engaging the side surface of the inserted card 31.

Furthermore, the first engagement portion 21e of the first contact member 21 is positioned lower than the second engagement portion 22d of the second contact member 22. For this reason, the first engagement surface 21f of the first engagement portion 21e is separated downward from the second engagement surface 22e of the second engagement portion 22d. That is, the contact points of the first contact member 21 and the second contact member 22 are in a non-contact state, and the switch composed of the first contact member 21 and the second contact member 22 is in the OFF position.

Next, when the card 31 is pushed in further toward the rear of the card connector 10, the downward projecting contact portions formed at the distal ends of the terminals 13 come into contact with insertion-end-side portions of the contact pads 32 arranged on the upper surface of the inserted side of the card 31. In this state as well, at the side edge of the card 31, the upper edge of the insertion end of the card 31 does not reach the downward projecting portion 21d of the first contact member 21. That is, the downward projecting portion 21d of the first contact member 21 is arranged in a position such that the downward projecting portion 21d comes into contact with the upper edge of the insertion end of the card 31 after contact is initiated between the terminals 13 and the contact pads 32.

Next, when the card 31 is pushed further toward the rear of the card connector 10, at the side of the card 31, the upper edge of the insertion end of the card 31 comes into contact with the lower (i.e., bottom) surface of the downward projecting portion 21d of the first contact member 21. When the card 31 reaches the rear of the card connector 10, at the side edge of the card 31, the downward projecting portion 21d of the first contact member 21 is pressed upward due to coming into contact with the upper edge of the insertion end of the card 31 and with an upper surface portion of the card 31 adjacent to the upper edge of the insertion end of the card 31. In this case, the entirety of the cantilevered body portion 21c extending rearward from the root portion 21a elastically deforms and inclines upward with the root portion 21a as the center. Therefore, the first engagement portion 21e, which is at a position that is more separated from the root portion 21a from the downward projecting portion 21d, rises by an amount that is greater than the amount of rising of the downward projecting portion 21d. In this manner, the first contact member 21 displaces in the thickness direction of the card 31 due to coming into contact with the upper surface of the card 31.

Next, when the loading of the card 31 to the card connector 10 is completed, a state as shown in FIG. 4 is created. In this state, the contact portions of the terminals 13 contact the middle portions of the contact pads 32 of the card 31. Further, the bottom surface of the downward projecting portion 21d of the first contact member 21 comes into contact with the upper surface of the card 31 and is pressed upward. In this case, the first contact member 21 is made from a resilient material, and the entire body portion 21c elastically deforms, so that the downward projecting portion 21d is biased downward by means of the spring function of the body portion 21c. The first engagement portion 21e of the first contact member 21 is pressed upward, so the first engagement surface 21f comes into contact with the second engagement surface 22e of the second engagement portion 22d of the second contact member 22. That is, the contact points of the first contact member 21 and the second contact member 22 are in a contact state, and the switch composed of the first contact member 21 and the second contact member 22 is in the ON position.

It should be noted that the operation or action of the switch when pulling out and removing the card 31 from the card connector 10 is performed in an order that is opposite to the order when the card 31 is inserted and loaded into the card connector 10. In this case, since the card connector 10 has a push/push structure, as shown in FIG. 4, when the card 31 is further pushed toward the rear of the card connector 10 in state where loading of the card 31 has been completed, the card 31 is pushed out toward the front by the slide member 14 of the card-eject mechanism.

Once this happens, at the side edge of the card 31, the upper edge of the insertion end of the card 31 moves away from the downward projecting portion 21d of the first contact member 21 and toward the front. Therefore, the state where the bottom surface of the downward projecting portion 21d of the first contact member 21 is pressed and lifted upward by the upper surface of the card 31 is released (i.e., it is no longer pressed upward by the card 31). Then the downward projecting portion 21d, which is biased downward by means of the spring function of the body portion 21c, moves downward when the card 31 moves away from the lower side of the downward projecting portion 21d. Upon such movement, the body portion 21c, which was inclining upward with the root portion 21a as its center, returns to its original position such that the switch returns to the state shown in FIG. 3. As a result, the first engagement surface 21f of the first engagement portion 21e separates downward from the second engagement surface 22e of the second engagement portion 22d, and the contact points between the first contact member 21 and the second contact member 22 enter a non-contact state and the switch composed of the first contact member 21 and the second contact member 22 goes into the OFF position.

Next, detailed descriptions will be given regarding the operation where the first engagement surface 21f of the first contact member 21 comes into contact with the second engagement surface 22e of the second contact member 22.

Figure 5:
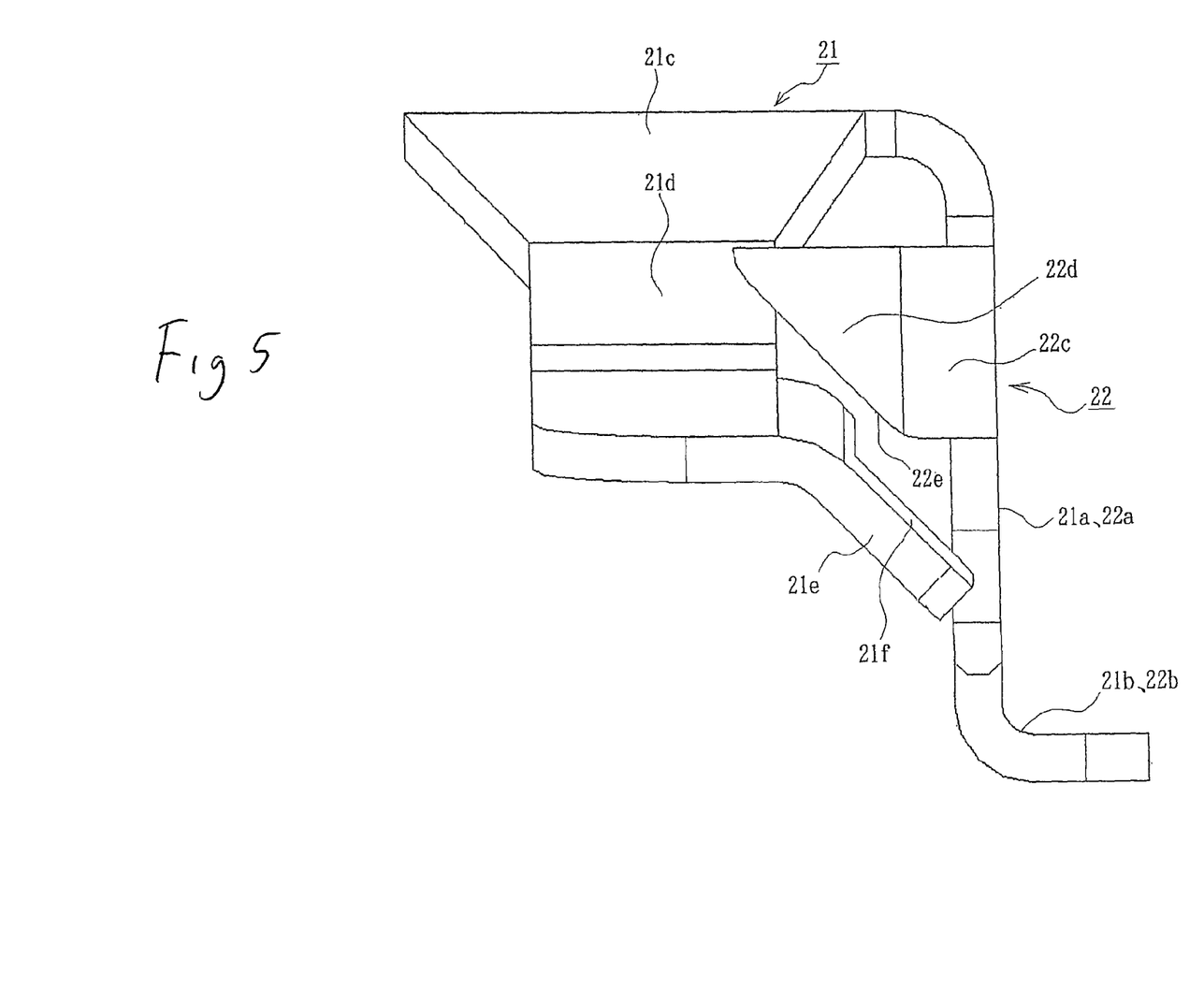
FIG. 5 is a view showing the positional relation between a first contact member and a second contact member of the card connector before a card is inserted or in the process of being inserted.
Figure 6:
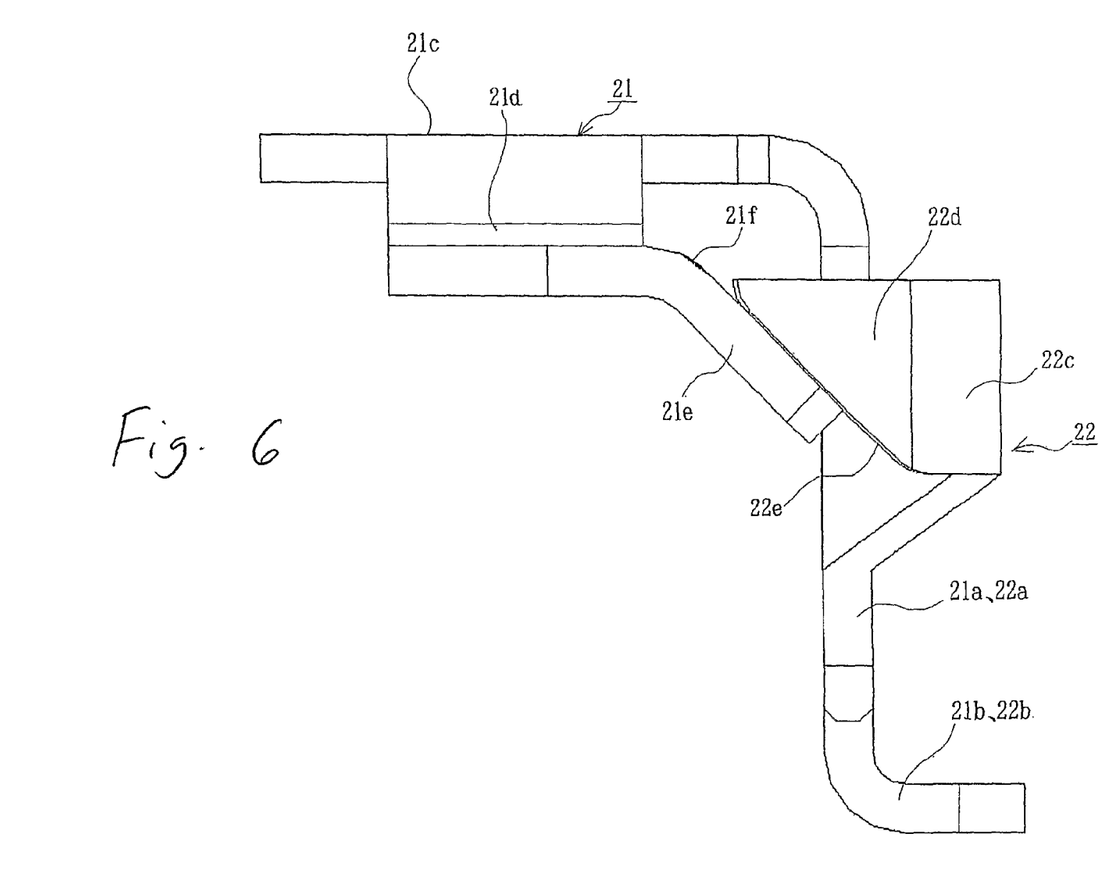
FIG. 6 is a view showing the positional relation between the first contact member and the second contact member after insertion of the card is completed.

FIG. 5 is a view showing the positional relation between a first contact member and a second contact member of the card connector before a card is inserted or in the process of being inserted; and FIG. 6 is a view showing the positional relation between the first contact member and the second contact member after insertion of the card is completed.

FIGS. 5 and 6 are views of the first contact member 21 and the second contact member 22 as viewed from the rear side thereof. These drawings are provided so as to show the positional relation between the first engagement portion 21e of the first contact member 21 and the second engagement portion 22d of the second contact member 22 when they are in the states shown in FIGS. 3 and 4, respectively. In order to facilitate description, all members except the first contact member 21 and the second contact member 22 are omitted from these drawings.

As described above, when the downward projecting portion 21d is not in contact with the upper surface of the inserted card 31 at the initial state, the first engagement portion 21e of the first contact member 21 is positioned lower than (i.e., underneath) the second engagement portion 22d of the second contact member 22, as seen in FIG. 5. Therefore, the first engagement surface 21f of the first engagement portion 21e is separated downward from the second engagement surface 22e of the second engagement portion 22d.

Here, since the first engagement portion 21e is bent so as to form a predetermined angle relative to the body portion 21c, the first engagement surface 21f, which is the upper surface of the first engagement portion 21e, also forms a predetermined angle relative to the body portion 21c and is thus inclined relative to the thickness direction of the card 31. It should be noted that since the body portion 21c is generally parallel with the bottom wall 11a of the housing 11, the first engagement surface 21f forms a predetermined angle relative to the bottom wall 11a. Further, as described above, since the first engagement portion 21e moves in the up and down directions, i.e., in a direction perpendicular to the body portion 21c, it can be said that the first engagement surface 21f forms a predetermined angle relative to the movement direction of the first engagement portion 21e. It should be noted that the angle formed by the first engagement surface 21f can be freely set, however, it is preferable that the angle be 45°.

Further, the distal end of the second engagement portion 22d of the second contact member 22 is bent to face toward the inner side of the card connector 10 so as to be generally perpendicular to the body portion 22c. The second engagement portion 22d is generally parallel to the wall surface of the rear wall 11b, which extends upright from the bottom wall 11a. Further, the lower side of the second engagement portion 22d is cut and removed at an angle and the cut surface thus becomes the second engagement surface 22e. In this case, the second engagement surface 22e is inclined relative to the thickness direction of the card 31, and the second engagement surface 22e is formed such that its angle is equal to the angle formed by the first engagement surface 21f. Further, since the second contact member 22, including the second engagement portion 22d, is formed from a plate of a resilient, electrically conductive material such as metal, the second engagement surface 22e is a cut surface of the plate. The second engagement surface 22e has a narrow elongated shape that extends along a direction extending from the upper left to the lower right in FIG. 5.

As described above, when the card 31 is pushed in toward the rear of the card connector 10, at the side edge of the card 31, the upper surface of the card 31 adjacent to the upper edge of the inserting end of the card 31 comes into contact with the bottom surface of the downward projecting portion 21d of the first contact member 21, whereby the downward projecting portion 21d of the first contact member 21 is pressed upward. Once this occurs, the entire body portion 21c elastically deforms and inclines upward with the root portion 21a as the center of deformation, so the first engagement portion 21e moves upward, and the first engagement surface 21f comes into contact with the second engagement surface 22e of the second engagement portion 22d. In this case, the first engagement surface 21f is formed so as to form a predetermined angle (i.e., 45°) relative to the movement direction of the first engagement portion 21e. Further, the second engagement surface 22e is also formed so as to form an angle (i.e., 45°) equal to that of the first engagement surface 21f, so the cosine component of the force with which the first engagement portion 21e is pressed upward acts as the contact pressure between the first engagement surface 21f and the second engagement surface 22e. In other words, a force corresponding to a value obtained by multiplying, by the value of cos 45°, the value of the force with which the first engagement portion 21e is pressed upward acts on the contact surfaces of the first engagement surface 21f and the second engagement surface 22e as a force of the vertical direction.

Further, the first engagement surface 21f is formed to form a predetermined angle relative to the movement direction of the first engagement portion 21e, and the second engagement surface 22e is also formed to form an angle equal to that of the first engagement surface 21f. Therefore, the second engagement portion 22d receives force toward the outer side with respect to the card connector 10 due to the force with which the first engagement portion 21e is pressed upward. Therefore, the entirety of the cantilevered body portion 22c extending reward from the root portion 22a elastically deforms, and the second contact member 22 inclines outward with the root portion 22a as the center of deformation. Due to this, the second engagement portion 22d moves toward the outside with respect to the card connector 10. In this manner, the second contact member 22 is displaced in the widthwise direction of the card 31 by the first contact member 21.

When the loading of the card 31 into the card connector 10 is completed, the positional relation between the first engagement portion 21e of the first contact member 21 and the second engagement portion 22d of the second contact member 22 becomes as shown in FIG. 6. When compared to the state shown in FIG. 5, it can be understood that the first engagement portion 21e has been moved upward and the second engagement portion 22d has been moved toward the outside of the card connector 10. In this case, from the initiation of contact between the first engagement surface 21f of the first engagement portion 21e and the second engagement surface 22e of the second engagement portion 22d until loading of the card 31 into the card connector 10 is completed, the first engagement portion 21e moves upward by a certain distance; and the second engagement portion 22d also moves toward the outside of the card connector 10 by a certain distance. Therefore, it can be seen that the first engagement surface 21f and the second engagement surface 22e mutually rub against each other such that a long-distance wiping is performed. Further, in the present embodiment, the second engagement surface 22e is a cut surface of a plate, and has a narrow elongated shape, so the contact pressure per unit area between the first engagement surface 21f and the second engagement surface 22e is relatively high. Therefore, it can be understood that wiping between these two members is performed at a high contact pressure.

It should be noted that the operation of the first engagement portion 21e and the second engagement portion 22d when pulling out and removing the card 31 from the card connector 10 is performed in an order that is opposite to the above-described order when the card 31 is inserted and loaded into the card connector 10. In this case, when the card 31 is pushed out toward the front by the slide member 14 of the card-eject mechanism, at the side edge of the card 31, the upper edge of the insertion end of the card 31 moves away from the downward projecting portion 21d of the first contact member 21 and toward the front. Therefore, the state where the bottom surface of the downward projecting portion 21d is pressed upward by the upper surface of the card 31 is released. Since the first contact member 21 is biased downward by means of the spring function of the body portion 21c, the first contact member 21 moves downward. Due to this, the first engagement portion 21e moves downward and returns to its original position, thus returning to the state shown in FIG. 5.

Further, the force which acts on the second engagement portion 22d toward the outside of the card connector 10 is removed. Since the second contact member 22 is biased toward the interior of the card connector 10 by means of the spring function of the body portion 22c, the second contact member 22 moves inward so as to return to its original position, thus returning to the state shown in FIG. 5. Due to this, the contact points of the first contact member 21 and the second contact member 22 go into a non-contact state, and the switch composed of the first contact member 21 and the second contact member 22 goes into the OFF position.

As described above, the card connector 10 according to the present embodiment includes a switch which is composed of the first contact member 21, which displaces in the thickness direction of the card 31 upon coming contact with the upper surface of the card 31 and which has the first engagement surface 21f inclined relative to the thickness direction of the card 31, and the second contact member 22, which has the inclined second engagement surface 22e to come into contact with the first engagement surface 21f and which is displaced by the first contact member 21 in the widthwise direction of the card 31.

In this case, the first engagement portion 21e moves upward due to the upper surface of the card 31 coming into contact with the bottom surface of the downward projecting portion 21d, and the first engagement surface 21f comes into contact with the second engagement surface 22e of the second engagement portion 22d. That is, in the present embodiment, through movement of the first contact member 21, which is displaced in accordance with the size of the card 31 in the thickness direction thereof, the contact points of the first contact member 21 and the second contact member 22 are brought into contact with each other. Since the size of the card 31 in the widthwise direction thereof is not used, the switch is not influenced by play in the widthwise direction existing between the card 31 and the card connector 10, inclination of the card 31 or variation in the size of the card in the widthwise direction thereof. Accordingly, the amount of displacement of the first contact member 21 becomes more stable, so that the contact pressure of the contact points and the amount of wiping become more stable. Due to this, electrical contact at the contact points of the switch is more certain and reliable. It should be noted that although it is conceivable that the switch would be adversely affected by variation in the size of the card 31 in the thickness direction thereof, any such variation is typically smaller than the variation in the size of the card 31 in the widthwise direction thereof. Therefore, the adverse effect on the amount of displacement of the first contact member 21 is generally extremely small.

Further, the first contact member 21 displaces in the thickness direction of the card 31 and the second contact member 22 displaces in the widthwise direction of the card 31. That is, since one member of the switch displaces in the thickness direction and the other member displaces in the widthwise direction, the switch can be made smaller than a case where both members of the switch displace in the thickness direction or in the widthwise direction. Furthermore, the inclined first engagement surface 21f and second engagement surface 22e are caused to contact each other in the thickness direction to thereby convert displacement of the first contact member 21 in the thickness direction into displacement of the second contact member 22 in the widthwise direction. Accordingly, the structure of the switch can be simplified and the switch made to be smaller. Further, since the first contact member 21 and second contact member 22 themselves have spring properties (resiliency), the number of parts can be reduced, the structure of the switch can be simplified, and cost can be reduced.

Furthermore, since the downward projecting portion 21d is formed by bending the plate, which forms the body portion 21c, into a crank shape, the position of the downward projecting portion 21d can be easily adjusted, and the timing at which the downward projecting portion 21d comes into contact with the upper surface of the card 31 can be adjusted. Therefore, through adjustment of the timing at which the contact points of the first contact member 21 and the second contact member 22 contact and the switch goes into the ON position, there can be attained setting such that the switch is turned on after the terminals 13 of the card connector 10 and the contact pads 32 of the card 31 establish reliable contact therebetween. That is, it becomes easier to adjust the timing, at which the contact points of the first contact member 21 and second contact member 22 come into mutual contact, so as to ensue the above-described sequence; i.e., the switch being turned on after the terminals 13 of the card connector 10 and the contact pads 32 of the card 31 establish reliable contact therebetween.

Furthermore, the switch is configured such that the second contact member 22 displaces in the widthwise direction of the card 31 in a state in which the slanted second engagement surface 22e is in contact with the slanted first engagement surface 21f of the first contact member 21, which displaces in the thickness direction of the card 31. Therefore, wiping is performed due to the linear movement of the second engagement surface 22e relative to the first engagement surface 21f. Therefore, the surfaces of the first engagement surface 21f and the second engagement surface 22e are sufficiently wiped, whereby they are cleaned with certainty and contact failure can be prevented with certainty.

Furthermore, since the first engagement surface 21f and the second engagement surface 22e are formed to have inclinations, the range of variation in contact pressure between the first engagement surface 21f and the second engagement surface 22e is small, and the wiping can be made to be stable. For example, in the case where the contact surfaces of terminals come into contact from the front surfaces, as is the case of the conventional switches, when the force applied to one terminal so as to press the terminal against the other terminal varies in a range of 20 grams force (gf) to 40 gf, the contact pressure varies in the same range of 20 gf to 40 gf. In contrast, in the present embodiment, the first engagement surface 21f and the second engagement surface 22e are formed at, for example, 45°. Therefore, as described above, a force corresponding to a value obtained by multiplying, by the value of cos 45°, the value of the force with which the first engagement portion 21e is pressed upward, acts on the contact surfaces of the first engagement surface 21f and the second engagement surface 22e as a force of the vertical direction. Accordingly, the contact pressure becomes such that its range of variation becomes 14.14 gf to 28.28 gf. In this manner, the range of variation in contact pressure between the first engagement surface 21f and the second engagement surface 22e becomes small, so wiping can be stabilized and a stable wiping effect can be obtained.

In the above-described embodiment, the case where the first contact member 21 comes into contact with the upper surface of the card 31 has been described. However, the card connector may be modified such that the first contact member 21 comes into contact with the bottom surface of the card 31. Further, in the above-described embodiment, the downward projecting portion 21d is formed by bending the plate, which forms the body portion 21c, into a crank shape. However, a projecting portion may be formed on the bottom surface of the body portion 21c to be used as the downward projecting portion 21d. Further, in the above-described embodiment, the switch composed of the first contact members 21 and the second contact members 22 is configured such that the switch is maintained OFF in the initial state. However, the switch may be configured such that the switch is maintained ON in the initial state.

While a preferred embodiment of the invention is shown and described, it is envisioned that those skilled in the art may devise various modifications without departing from the spirit and scope of the foregoing description and the appended claims. As such the present invention is not limited to the above-described embodiment. Numerous modifications and variations of the present invention are possible in light of the spirit of the present invention, and they are not excluded from the scope of the present invention.

What is claimed is:

1. A card connector for receiving a card, the card having contact pads, a thickness and a width perpendicular to the thickness, the card connector comprising:

a housing, the housing having a slot for receiving the card;

conductive terminals, the conductive terminals disposed within the housing and which contact the contact pads; and a switch, the switch including a first contact member and a second contact member, the first contact member being moveable in a direction parallel to the thickness direction of the card upon insertion of the card into the housing such that the first contact member moves relative to the second contact member;

wherein:

the first contact member includes a first engagement surface, the first engagement surface being inclined relative to the thickness direction of the card; and the second contact member includes a second engagement surface, the second engagement surface being inclined relative to the thickness direction of the card for engaging the first engagement surface, being a cut surface of a plate material and sliding on the first engagement surface.

2. The card connector according to claim 1, wherein the first contact member engages the second contact member upon insertion of the card.

3. The card connector according to claim 1, wherein the second contact member is displaced in the widthwise direction of the card when the first contact member engages the second contact member.

4. The card connector according to claim 1, wherein the first contact member disengages from the second contact member upon insertion of the card.

5. The card connector according to claim 1, wherein the second contact member is displaced in the widthwise direction of the card when the first contact member disengages from the second contact member.

6. The card connector according to claim 1, wherein the second contact member is displaced in the widthwise direction of the card upon insertion of the card into the housing.

7. The card connector according to claim 1, wherein the switch extends along a side wall of the housing slot.

8. The card connector according to claim 1, wherein the first contact member is formed from a plate of a resilient, electrically conductive material, and includes:

a root portion, the root portion being attached to a side wall of the housing;

a body portion, the body portion extending from the root portion toward a rear wall of the housing;

a first engagement portion , the first engagement portion being connected to the distal end of the body portion and including the first engagement surface; and a projecting portion, the projecting portion projecting toward the card side at a location offset from the first engagement portion toward the root portion, the projecting portion coming into contact with the upper surface or bottom surface of the card.

9. The card connector according to claim 1, wherein the second contact member is formed from a plate of a resilient, electrically conductive material, and includes:
- a root portion, the root portion being attached to a side wall of the housing;
- a body portion, the body portion extending from the root portion toward a rear wall of the housing; and
- a second engagement portion, the second engagement portion being connected to the distal end of the body portion, extending in the widthwise direction of the card, and including the second engagement surface at a distal end thereof.

* * * * *